March 16, 1937.     H. A. WILSON     2,073,668
POWER TRANSMITTING MECHANISM
Filed April 3, 1930

Inventor
H. A. Wilson
by G. J. DeWein
Attorney

Patented Mar. 16, 1937

2,073,668

UNITED STATES PATENT OFFICE 2,073,668

POWER TRANSMITTING MECHANISM

Herbert A. Wilson, West Allis, Wis., assignor to Allis-Chalmers Manufacturing Company, Milwaukee, Wis., a corporation of Delaware Application April 3, 1930, Serial No. 441,186

8 Claims. (Cl. 74—233)

The present invention relates in general to improvements in the art of transmitting power, and relates more specifically to improvements in the construction and operation of belt drives of the type wherein one or more endless belts of either continuous or spliced formation, are utilized to transmit rotary motion from a driving shaft to one or more driven shafts.

An object of the invention is to provide an improved belt structure which is adapted to cooperate with V-shaped grooves so as to transmit reverse rotary motion by side driving surface contact between the belt and the grooves.

A condition frequently arises where it becomes desirable to rotate adjacent shafts in opposite directions with the aid of one or more endless driving elements. While it has heretofore been proposed to utilize flat belts coacting with ordinary pulleys, or relatively inelastic round ropes coacting with V-grooved sheaves, to meet such a condition, these prior devices are relatively unsatisfactory because of the resulting slippage and consequent wear on the belt or ropes and because the belts and ropes are not readily flexible inherent in the objectionable location of their tension elements either scattered throughout the belt when the same is flat or circularly arranged in the case of round belts. The ordinary V-belt which by its wedging action when cooperating with V-grooves is adapted to reduce slippage losses and resultant wear to a minimum, is of trapezoidal cross-section and is therefore not capable of effectively coacting with V-grooved sheaves located on and cooperating with the inner and outer sides of the belt. In the present invention the above named defects or deficiencies of the flat belts and round ropes are obviated by reason of the location in the improved reverse driving belt of the longitudinal tension or reinforcing cords in a group located along the major diameter directed at right angles to the plane of the belt. In this invention, therefore, the single group of longitudinal tension or pulling elements serves efficiently and satisfactorily in both cases of driving, that is, when the driven member is rotated in the same direction and when the driven member is rotated in a reverse direction. This follows from the fact that this single group of tension elements is located along the neutral section or axis of the belt in either case of driving.

It is a more specific object of the present invention to provide an improved belt which is of double V or hexagonal construction and presenting inner and outer V-driving faces, so that it may be caused to wedgingly cooperate with V-grooves disposed either inside or outside of the belt loop. Such a belt, which may be utilized either singly or in multiple, may also be employed to drive a sheave associated with a shaft located between bearings which prevent disposition of the belt around the sheave and shaft. The belt may also be used to drive adjacent sheaves in opposite directions as in the case of sheaves which drive cooperating crushing or disintegrating rolls, and the improved construction is applicable to either continuous or spliced belts. The improved belt is preferably formed to flex readily during operation in either direction, and may be provided with inner and outer flat or corrugated peripheral surfaces. In order to obtain maximum grip and minimum slip, the inner and outer sets of cooperating side driving surfaces should preferably be substantially devoid of interruption, although the cross-sectional area of the belt may vary as in belts having inner and outer corrugated peripheral surfaces. These and other advantageous features of the improved belt structure will be apparent from the following detailed description.

A clear conception of an embodiment of the invention and of the mode of constructing and of utilizing belts manufactured in accordance therewith, may be had by referring to the drawing accompanying and forming a part of this specification wherein like reference characters designate the same or similar parts in the several views.

Figure 1:
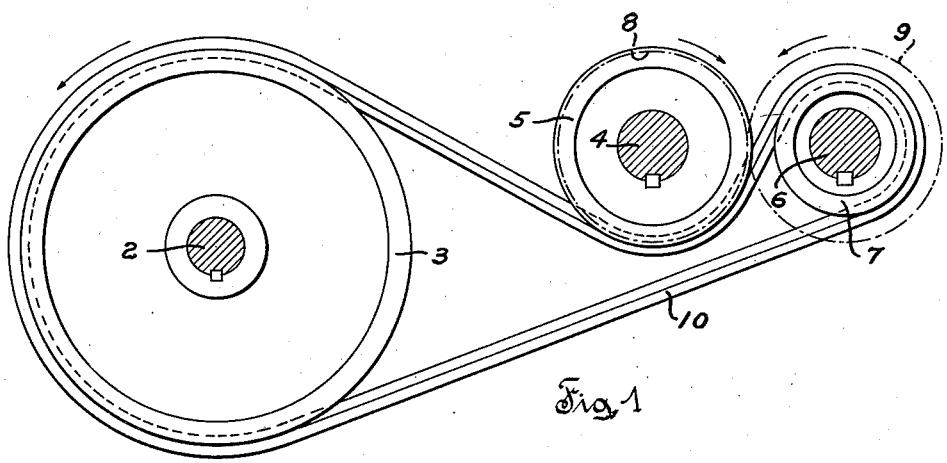
Fig. 1 is a side elevation of a three sheave rope drive embodying four of the improved belts, the drive being utilized to operate a set of cooperating crushing rolls.

Referring specifically to the drawing, the roll drive illustrated comprises in general a driving sheave 3 mounted upon a main driving shaft 2, and two oppositely rotatable driven sheaves 5, 7 mounted upon shafts 4, 6 respectively, which support the cooperating crushing rolls 8, 9. The sheaves 3, 5, 7 have four sets of alined V-grooves 11, and the driven sheave 5 is rotatable in a direction opposite from that of the driven sheave 7 and at a lower speed, by virtue of its larger diameter, thereby producing a differential peripheral speed of the rolls 8, 9. The bearings for the roll supporting shafts 4, 6 are ordinarily provided with means for adjusting the rolls 8, 9 laterally with respect to each other so as to compensate for wear, and the main driving shaft 2 may be provided with means for effecting lateral adjustment thereof so as to properly tension the endless driving belts 10 cooperating with the sheaves 3, 5, 7.

Figures 2, 3:
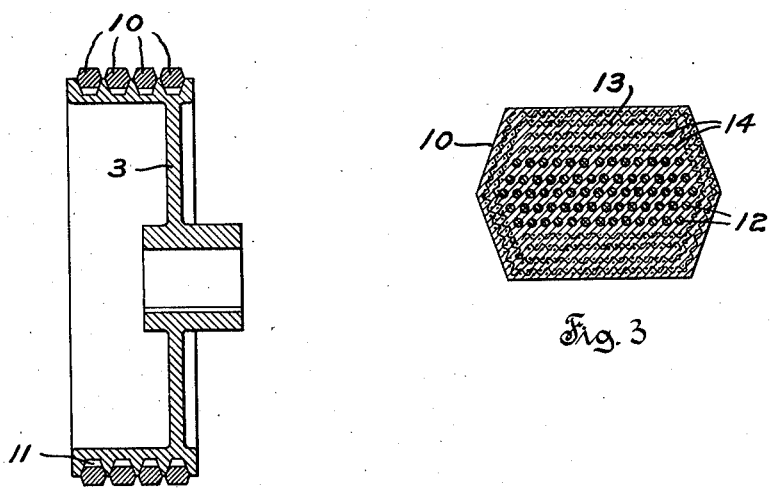
Fig. 2 is a central vertical section through the driving sheave of the drive illustrated in Fig. 1.
Fig. 3 is an enlarged transverse section through one of the rubber composition hexagonal belts.
Figure 4:
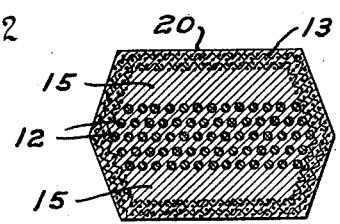
Fig. 4 is a similarly enlarged transverse section through a rubber composition hexagonal belt of modified construction.

As illustrated in Figs. 2, 3 and 4, the driving belts 10 are preferably of uniform hexagonal cross-section, resembling two truncated isosceles triangles having their bases parallel and, as shown herein, substantially coincident, and being provided with inner and outer sets of relatively inclined cooperating side driving planar surfaces forming the sides of the portions of isosceles triangular cross sectional area. While the inner and outer peripheral surfaces of the belts 10 are illustrated as being smooth, since provided by pure truncation, it is to be understood that these surfaces may be corrugated if desired, in order to increase the flexibility of the belts. The belts 10 are preferably formed of rubber composition in order to provide the desired elasticity, each belt consisting of a group of cords and layers of fabric impregnated with and embedded in soft rubber. As illustrated in Fig. 3, the belt consists of a number of layers forming a group of cords 12 disposed across the major diameter of the hexagon, and extending longitudinally throughout the length of the belt, this layer of cords constituting a substantially inextensible, strength imparting core having its axis symmetrically disposed with respect to the side driving surfaces of both of the portions of truncated isosceles triangular cross section and being located at the neutral axis of the belt. Located on the inner and outer sides of the group of cords 12, are several layers of fabric 14, and the core, consisting of the group of cords 12, and the layers of fabric 14 are surrounded by one or more layers of fabric 13 extending in close proximity to the perimeter of the belt.

As illustrated in Fig. 4, the belt 20 is likewise of hexagonal cross-section and is again provided with a number of cords 12, constituting a substantially inextensible strength imparting core, disposed across the major diameter of the hexagon and extending longitudinally of the belt and having its axis in the neutral axis of the belt. Disposed on the inner and outer sides of the group of cords 12, are relatively thick layers 15 of pure gum or rubber. The core consisting of the cords 12 and the layers 15 of gum or rubber, are surrounded by one or more layers of fabric 13 disposed closely adjacent to the perimeter of the belt, the portions of truncated isosceles triangular cross sectional area having their bases substantially coincident and being symmetrical about the axis of the core and the belt. The purpose of utilizing layers 15 of pure gum or rubber as in Fig. 4, is to secure greater lateral flexibility of the belt 20 as compared to the belt 10, wherein the fabric 14 will tend to somewhat stiffen the belt.

During normal operation of the drive illustrated in Fig. 1, the driving pulley 3 may be rotated in the direction indicated by the arrow by applying power to the main driving shaft 2, thus causing the belts 10, in their travel in arcuate paths of opposite curvature, to drive the roll sheaves 5, 7 in opposite directions relative to each other, as indicated. Due to the hexagonal construction of the driving belts 10 and the location of the reinforcing cords in an elongated group along the major diameter, these belts will readily flex in either direction during operation and will produce sufficient wedging driving contact with the grooves of the sheaves 5, 7 to substantially eliminate slippage and to effectively rotate the rolls 8, 9 in reverse or opposite directions. If the rolls 8, 9 become worn, the shafts 4, 6 may be moved laterally toward each other without materially affecting the drive, this being impossible when gears are used to rotate the rolls. The formation of the belts of rubber composition provides sufficient elasticity to insure proper wedging action of the belts within the grooves 11, thereby eliminating slippage and producing maximum efficiency of driving. A hexagonal belt of the type illustrated may also be utilized to advantage for driving shafts supported by bearings which prohibit placing ordinary endless belts around the shafts. The belts may moreover be utilized to cooperate with one or more idler pulleys and obviously need not be applied to drives of the specific type illustrated herein.

It should be understood that it is not desired to limit the invention to the exact details of construction and operation herein shown and described, for various modifications within the scope of the claims may occur to persons skilled in the art.

It is claimed and desired to secure by Letters Patent:

1. An endless, flexible belt having a uniform cross sectional area throughout its entire length, the cross section resembling two truncated isosceles triangles having a common base, said belt being composed of a substantially inextensible core and rubberized fabric enclosing said core, the inclined faces at each side of said common base constituting a pair of driving surfaces, the driving surfaces at opposite sides being adapted to traverse arcuate paths of opposite curvature, whereby the belt is caused to flex in opposite directions, said belt having a neutral axis in the plane of said common base and common to all of said driving surfaces, and said core being located in said common neutral axis and arranged symmetrically with respect to all of said driving surfaces.

2. An endless, flexible belt having the cross sectional area of its active driving portions resembling two truncated isosceles triangles having a common base, said belt being composed of a substantially inextensible core and rubberized fabric enclosing said core, the inclined faces at each side of said common base constituting a pair of driving surfaces, the driving surfaces at opposite sides of said common base being adapted to traverse arcuate paths of opposite curvature, whereby the belt is caused to flex in opposite directions, said belt having a neutral axis in the plane of said common base and common to all of said driving surfaces, and said core being located at said common neutral axis and arranged symmetrically with respect to all of said driving surfaces.

3. An endless, flexible belt having the cross sectional area of its active driving portions resembling two truncated isosceles triangles having their bases parallel and adjacent each other in a common base portion throughout the length of the belt, said belt being composed of a substantially inextensible strength imparting core and rubberized fabric enclosing said core, the inclined faces of each of said parts of truncated triangular cross sectional area extending from said common base portion constituting a pair of driving surfaces, said pairs of driving surfaces being adapted to traverse arcuate paths of opposite curvature, whereby the belt is caused to flex in opposite directions, said belt having a neutral axis in said common base portion and being common to all of said driving surfaces, and said core being located symmetrically with respect to said common neutral axis and arranged symmetrically with respect to all of said driving surfaces.

4. A reverse driving, endless, flexible transmission belt of utility in driving a plurality of V-grooved sheaves in opposite directions, the cross section of the belt resembling two truncated isosceles triangles with their bases parallel and closely adjacent each other and symmetrically disposed about the neutral axis of the belt, the sides of each of said parts of truncated triangular cross section constituting a pair of driving surfaces, a core of substantially inextensible, strength imparting material having its longitudinal axis substantially concident with the neutral axis of the belt, and reinforced rubberized material enclosing said core within said parts of truncated triangular cross section and bearing said driving surfaces, said portions of rubberized material and said side driving surfaces being symmetrically disposed with respect to the neutral axis of the belt and being adapted to flex in opposite directions whereby said pairs of side driving surfaces are adapted to traverse paths of opposite curvature in the normal operation of the belt in engagement with V-grooved sheaves.

5. A reverse driving, endless, flexible transmission belt having two pairs of side driving planar surfaces disposed on opposite sides of and symmetrically disposed with respect to the neutral axis of the belt, said pairs of surfaces forming the sides of a figure having a transverse cross sectional area resembling two truncated isosceles triangles with their bases closely adjacent and symmetrically disposed about the neutral axis of the belt, a core of substantially inextensible, strength imparting material having its longitudinal axis substantially coincident with the neutral axis of the belt, and portions of flexible elastic composition material united to and enclosing said core and bearing said side driving surfaces, said portions of elastic material and said side driving surfaces being symmetrically disposed about the neutral axis of the belt and being adapted to flex in opposite directions whereby said pairs of side driving surfaces are adapted to traverse paths of opposite curvature.

6. A power transmitting system, comprising a V-grooved driving sheave, a plurality of V-grooved sheaves located substantially in the plane of said driving sheave and disposed to be driven respectively in different directions, and an endless, flexible reverse driving belt comprising a substantially inextensible, strength imparting core element whose longitudinal axis is substantially coincident with the neutral axis of the belt, said belt having a cross sectional area resembling two truncated isosceles triangles having their bases parallel and in close proximity to each other to constitute a common base portion throughout the length of said belt, and portions of elastic composition material including fabric and rubber enclosing said core, the inclined faces of said portions of truncated triangular cross section at opposite sides of said common base portion constituting a pair of side driving surfaces symmetrically arranged with respect to the neutral axis of the belt, said belt being adapted to flex in opposite directions to cause the driving surfaces at opposite sides of said common base portion to traverse arcuate paths of opposite curvature upon said sheaves, and said belt being located in the grooves of said sheaves with one pair of said side driving faces of the belt in wedging driving engagement with one of said driven sheaves and the other pair of said side driving faces of the belt in wedging driving engagement with another of said driven sheaves.

7. An endless, flexible belt composed of a substantially inextensible core having its axis substantially coincident with the neutral axis of the belt, and a reinforced rubber structure enclosing said core, the cross sectional area of the active driving portions of said belt resembling two truncated isosceles triangles extending in opposite directions from and symmetrical about a common base portion whose axis is substantially coincident with the axis of said core and the neutral axis of the belt, the inclined faces of each of said portions of truncated isosceles triangular cross section constituting a pair of driving surfaces disposed symmetrically about said neutral axis, and said driving surfaces at opposite sides of said base portion being adapted to traverse arcuate paths of opposite curvature, whereby the belt is caused to flex in opposite directions.

8. A power transmitting system, comprising a plurality of V-grooved sheaves located substantially in the same plane, one of said sheaves being a driving sheave and being disposed to drive another of said sheaves in a reverse direction relative to said driving sheave, and an endless, flexible reverse driving belt comprising a substantially inextensible, strength imparting core element whose longitudinal axis is substantially coincident with the neutral axis of the belt, said belt having a cross sectional area resembling two truncated isosceles triangles having their bases parallel and in close proximity to each other to constitute a common base portion throughout the length of said belt, and portions of elastic composition material including fabric and rubber enclosing said core, the inclined faces of said portions of truncated triangular cross section at opposite sides of said common base portion constituting a pair of side driving surfaces symmetrically arranged with respect to the neutral axis of the belt, said belt being adapted to flex in opposite directions to cause the driving surfaces at opposite sides of said common base portion to traverse arcuate paths of opposite curvature upon said driving sheave and said one driven sheave, and said belt being located in the grooves of said driving sheave and said driven sheave with one pair of said side driving surfaces of the belt in wedging driving engagement with said driving sheave and the other pair of said driving surfaces of the belt in wedging driving engagement with said driven sheave.

HERBERT A. WILSON.